United States Patent [19]

Fukushima et al.

[11] Patent Number: 4,798,756

[45] Date of Patent: Jan. 17, 1989

[54] LAMINATE STRUCTURE OF INTERIOR FINISHING MATERIAL

[75] Inventors: Shigeyoshi Fukushima; Hidehiro Uno, both of Nagoya; Shigetoshi Mimura, Toyota, all of Japan

[73] Assignee: Toyo Tire & Rubber Company Limited, Osaka, Japan

[21] Appl. No.: 140,771

[22] Filed: Jan. 4, 1988

[30] Foreign Application Priority Data

Jan. 9, 1987 [JP] Japan ............................. 62-2210[U]
Jan. 9, 1987 [JP] Japan ............................. 62-2211[U]

[51] Int. Cl.⁴ .................... B32B 7/04; B32B 3/26; B32B 17/00
[52] U.S. Cl. .................................... 428/198; 428/246; 428/247; 428/251; 428/252; 428/317.1; 428/317.7

[58] Field of Search ............... 428/198, 246, 247, 251, 428/252, 317.1, 317.7

[56] References Cited

U.S. PATENT DOCUMENTS

| | | | |
|---|---|---|---|
| 2,928,456 | 3/1960 | Potchen et al. | 428/317.7 |
| 3,360,423 | 12/1967 | Lindberg | 428/198 |
| 3,666,595 | 5/1972 | Bauer | 428/198 |
| 4,054,710 | 10/1977 | Botsolas | 428/317.7 |
| 4,099,943 | 7/1978 | Fischman et al. | 428/317.7 |
| 4,276,341 | 6/1981 | Tanaka | 428/246 |

Primary Examiner—William J. Van Balen
Attorney, Agent, or Firm—Larson and Taylor

[57] ABSTRACT

The present invention provides laminate structures of interior finishing material having suitable air permeability and sound absorbing properties.

2 Claims, 2 Drawing Sheets

LAMINATE STRUCTURE OF INTERIOR FINISHING MATERIAL

The present invention relates to interior finishing materials, and more particularly to laminate structures of interior finishing material for use in motor vehicles for shaped ceilings, door trims, pillar garnishes, etc.

Conventional interior finishing materials for motor vehicles include molded materials which are recently used for lining the inside ceilings of motor vehicles. These materials include, for example, that prepared by molding glass fiber into a solid sheet with use of phenolic resin or like thermosetting resin. This material has drawbacks. Glass monofilaments, when adhering to the skin, cause discomfort, such as itching, to persons traveling in the vehicle. Glass fiber is expensive and must therefore be used in a limited amount, so that the glass fiber sheet needs to have the smallest possible thickness, which results in diminished rigidity. Another material is known which is prepared from a mixture of natural fiber and synthetic fiber by admixing a suitable amount of phenolic resin or like thermosetting resin with the mixture and subjecting the resulting mixture to compression molding. The material is excessively heavy for use as a ceiling material, while the molding conditions required, i.e. increased pressure of 1 to 3 kg/cm$^2$, mold temperature of 160° to 200° C. and heating time of 1 to 4 minutes, involve disadvantages. Another material is known which is prepared by sandwiching a metal lath net between two sheets of crosslinked highly expanded polyethylene foam. Although the lath net used has a considerably great thickness, the material has low rigidity, is excessively heavy for use as a ceiling material and can not be designed with great freedom. The conventional molded materials further include one comprising a layer of expanded thermoplastic synthetic resin foam, such as expanded polystyrene foam, and a reinforcing layer of natural fiber, synthetic fiber or the like. This material is not satisfactory as a lightweight material since the resin foam layer has a low expansion ratio of 3 to 15 times. The layer is made up of closed cells and accordingly has a low sound absorbing property (Examined Japanese Patent Publication No. 53257/1986).

The main object of the invention is to provide an interior finishing material free of the foregoing drawbacks.

The above and other objects of the invention will become apparent from the following description.

The present invention provides as an embodiment thereof a laminate structure of interior finishing material having suitable air permeability and sound absorbing properties, the laminate structure comprising a thermoplastic rigid polyurethane foam layer in the form of a plate-like member or slice, a reticular glass cloth layer provided on at least one surface of the foam layer, a nonwoven fabric layer provided on one surface of the assembly of the foam and cloth layers, and a facing layer provided on the other surface of the assembly, the fabric layer and the facing layer being individually provided on the different surfaces of the assembly individually and being adhered to the assembly with a slitted hotmelt adhesive film having a plurality of slits therein.

As another embodiment, the invention further provides a laminate structure of interior finishing material having suitable air permeability and sound absorbing properties, the laminate structure comprising a thermoplastic rigid polyurethane foam layer in the form of a platelike member or slice, a reinforcing layer of glass paper provided on each surface of the foam layer and adhered thereto with a hotmelt adhesive film having a plurality of slits therein, and a facing layer provided on the reinforcing layer over one surface of the foam layer.

The first embodiment of the invention will be described with reference to FIGS. 1 to 3. The embodiment comprises a thermoplastic rigid polyurethane foam layer 1, at least one reticular glass cloth layer 2, a nonwoven fabric layer 3 and hotmelt adhesive film layers 4 formed with minute slits therein. Indicated at 5 is a facing layer.

The polyurethane foam layer 1 to be used for the interior finishing laminate material of the invention is prepared by slicing a thermoplastic rigid polyurethane foam which is well known. Examples of the thermoplastic rigid polyurethane foam are described in UK Patent GB No. 2028714 B, Modern Plastics International, 6 (3) 17, 1976, etc.

Figure 4:
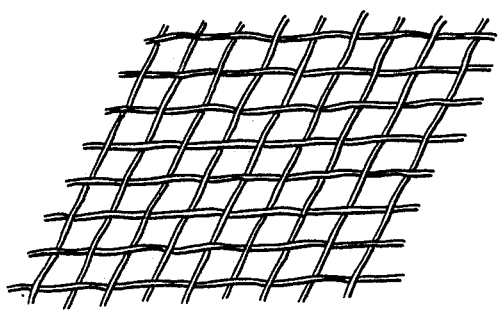
FIG. 4 shows a reticular glass cloth.
Figure 5:
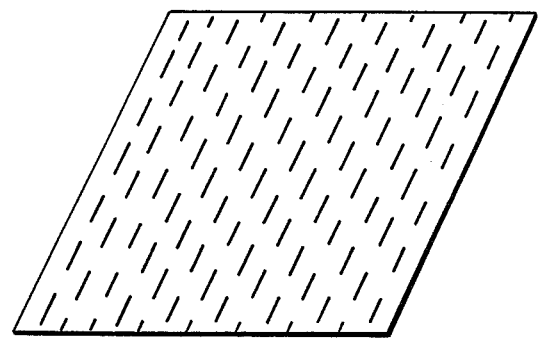
FIG. 5 shows a slitted hotmelt adhesive film.
Figure 6:
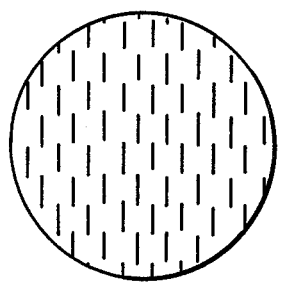
FIG. 6 is an enlarged view showing the surface of the film.
Figure 7:
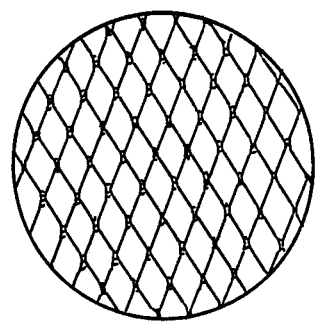
FIG. 7 is a view schematically showing the film with its slits enlarged to mesh-like openings by heating.

The reticular glass cloth layer 2 and the nonwoven fabric layer 3 each serve as a reinforcing layer. FIG. 4 shows a reticular glass cloth useful as the former layer. A synthetic fiber nonwoven fabric is used as the latter layer. Examples of useful synthetic fibers are polyamide, polyvinyl alcohol, polyvinylidene chloride, polyvinyl chloride, polyester, polyacrylonitrile, polyethylene, polypropylene, polyurethane and like fibers. Glass fiber is also useful. With respect to rigidity, a glass fiber nonwoven fabric is most desirable for use as the nonwoven layer shown in FIG. 2. A hotmelt adhesive is used in the form of a film as the layer 4. The hotmelt adhesive film to be used in this invention is formed with minute slits as seen in FIG. 5. FIG. 6 is an enlarged view showing the surface of the film. When the film is heated, the slits are enlarged to render the film recticular as shown in FIG. 7, consequently obviating the likelihood that the film will impair the air permeability and sound absorbing properties of the present material.

For example, a nonwoven fabric (print), or a knitted or woven fabric of fiber is used as the facing layer 5. Also useful is a laminate of such a fabric and a synthetic resin foam, typical of which is soft polyurethane foam. To assure the interior finishing material of the desirable air permeability and sound absorbing properties, the synthetic resin foam must substantially be open cellular.

Figure 1:
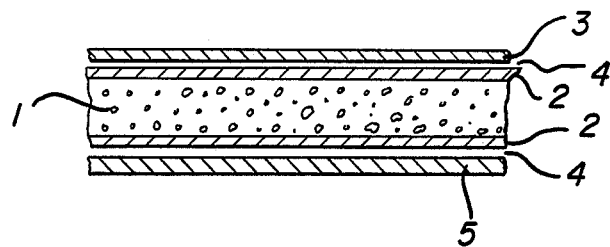
FIGS. 1 to 3 are sectional views showing laminate structures of interior finishing material of the invention.
Figure 2:
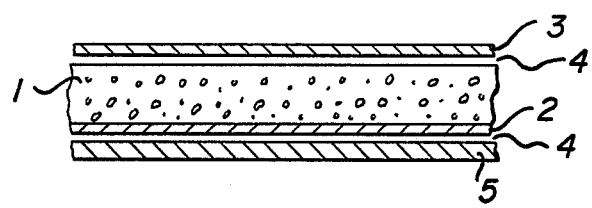
Figure 3:
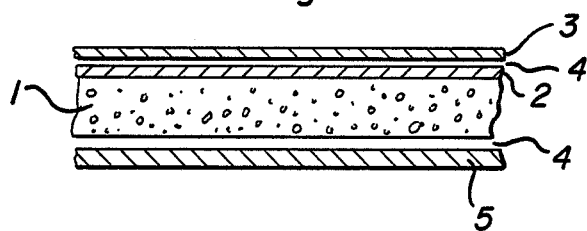

The interior finishing laminate material of FIG. 1 to 3 is prepared, for example, in the following manner. The layers, other than the facing layer, are bonded together in the form of a laminate using a heat press, heat rolls, etc. The laminate is heated preferably at 180° to 190° C. for 15 to 35 seconds to obtain a base material. The facing layer was placed over the hotmelt adhesive film layer opposite to the other film layer adhering the nonwoven fabric layer, and the resulting assembly was pressed after heating. The heating is conducted preferably with use of an infrared heater, at 350° to 400° C. for 25 to 35 seconds. In the heating process, the surface temperature of the assembly is brought about at 180° to 190° C. The assembly is taken out from the infrared heater and then placed in a press-molding for heating at a temperature below 130° C. for several tens of seconds, preferably at 60° to 65° C. for 30 to 60 seconds. After the press-molding, the resulting pressed panel is taken out from the molding. The adhesive film layer beneath the facing layer may be formed with release paper superposed thereon.

Figure 8:
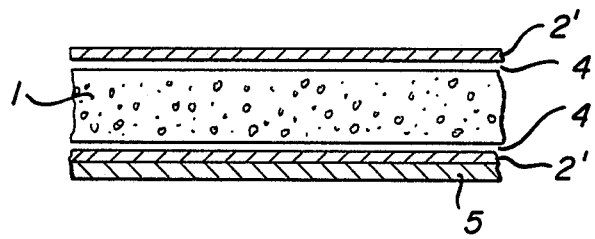
FIG. 8 is a sectional view showing another laminate structure of interior finishing material of the invention.

With reference to FIG. 8, the second embodiment of the invention comprises a thermoplastic rigid polyurethane foam layer 1, glass paper layers 2', hotmelt adhesive film layers 4 formed with minute slits, and a facing layer 5 provided over one of the glass paper layers.

The polyurethane foam layer 1, the adhesive layer 4 and the facing layer 5 to be used can be the same as those used for the first embodiment. As the glass paper layer 2' serving as a reinforcing layer, paper is used which is prepared by forming a web of glass fiber by a paper making machine and applying a synthetic resin to the web to fix the fiber and form a hard sheet. When a small amount of pulp is admixed with the glass fiber, the web can be formed easily at a lower cost. Examples of useful synthetic resins to be applied to the web are melamine resin, urea resin, epoxy resin, polyvinyl chloride (PVC), polyvinyl alcohol (PVA), polyvinyl acetate ($PVA_c$), polyvinyl butyral, acrylic acid ester copolymer, butadiene copolymer and the like.

The interior finishing laminate material of FIG. 8 according to the invention is prepared, for example, by bonding together the layers, other than the facing layer, in the form of a laminate, by heating to obtain a base material, placing the facing layer having the adhesive over one of the glass paper layers, and pressing the assembly after heating. The conditions of heating and pressing in the preparation of the base material and the assembly are the same as those described in the laminate material of FIG. 1 to 3.

The material of the invention is made lightweight by the use of a polyurethane foam having a high expansion ratio. The polyurethane is a special rigid polyurethane having thermoplastic properties and improved shaping capabilities and permitting designing with greater freedom. The use of the reticular glass cloth and the nonwoven fabric, or the glass paper for reinforcement eliminates the likelihood of glass monofilaments adhering to the skin to preclude discomfort. The forming conditions include heating with upper and lower infrared heaters, at about 350° to 400° C. for 25 to 35 seconds and pressing for several tens seconds, for example, 30 seconds. The material can therefore be formed within a short period of time. Further the material can be prepared at a low temperature of about 180° to 190° C. at the surface of the laminate. The hotmelt adhesive film having minute slits and used for adhering the reinforcing layer or the like to the polyurethane layer does not impair the air permeability and sound absorbing properties of the present material.

The present invention will be described in detail with reference to the following examples.

EXAMPLE 1

A thermoplastic rigid polyurethane foam (0.045 g/cm³ in density and 1.8 mm in cell size) was sliced to obtain a plate 8 mm in thickness, 1300 mm in width and 1700 mm in length. A base plate was prepared by sandwiching the foam plate between two sheets of recticular glass cloth (weighing 43 g/m²) and further between two sheets of hotmelt adhesive film (weighing 50 g/m²), having a multiplicity of slits therein placing a polyester nonwoven fabric (weighing 50 g/m²) over one surface of the resulting assembly, placing release paper over the other surface of the assembly, bonding the layers together by a heat press at about 180° C. and removing the release paper.

A facing material prepared by laminating a sheet of soft polyurethane foam, 2 mm in thickness, to nylon tricot was placed over the film exposed surface of the base plate. A motor vehicle ceiling member was prepared by heating the resulting assembly by two far infrared heaters, spaced apart by about 300 mm, from above and below at about 400° C. for about 25 seconds to bring about a surface temperature of about 180° C., and treating the assembly by a press at a die temperature of about 65° C. for 30 seconds. The ceiling member had the section of FIG. 1 in section, a thickness of about 7 mm and a high quality.

EXAMPLE 2

A thermoplastic rigid polyurethane foam was sliced in the same manner as in Example 1 into a plate, 8 mm in thickness, 1300 mm in width and 1700 mm in length. A base plate was prepared by placing in layers a glass fiber nonwoven fabric (weighing 50 g/m²), a slitted hotmelt adhesive film (weighing 50 g/m"), the polyurethane foam plate, a reticular glass cloth (weighing 43 g/m²), a hotmelt adhesive film (weighing 50 g/m²) having multiple slits therein and release paper, bonding the layers together by a heat press at about 180° C. and removing the release paper. A motor vehicle ceiling member was prepared by placing nylon tricot serving as a facing material over the film exposed surface of the base plate, heating the assembly under the same conditions as in Example 1 and press-forming the assembly. The ceiling member had the section of FIG. 2, a thickness of about 5 mm and a high quality.

EXAMPLE 3

A thermoplastic rigid polyurethane foam (0.045 g/cm³ in density and 1.8 mm in cell size) was sliced to obtain a plate, 8 mm in thickness, 1300 mm in width and 1700 mm in length. Glass paper weighing 50 g/m² and coated with a binder of epoxy resin was bonded to the opposite surfaces of the plate with a slitted hotmelt adhesive film having a plurality of slits therein and weighing 50 g/m² by heat-pressing at about 180° C. to obtain a base plate. Nylon tricot serving as a facing material and having laminated thereof a 2—mm—thick soft polyurethane foam sheet lined with a hotmelt adhesive layer was placed over one surface of the base plate. The assembly was then heated by far infrared heaters, spaced apart by about 300 mm, from above and below at about 400° C. for about 25 seconds to bring about a surface temperature of about 180° C. and treated by a press at a die temperature of about 65° C. for 30 seconds, whereby a motor vehicle ceiling member was obtained which had the section of FIG. 8, a thickness of about 7 mm and a high quality.

We claim:
1. A laminate structure of interior finishing material having suitable air permeability and sound absorbing properties, the laminate structure comprising a thermoplastic rigid polyurethane foam layer in the form of a platelike member, a reticular glass cloth layer provided on at least one surface of the foam layer, a nonwoven fabric layer provided on one surface of the assembly of the foam and cloth layers, and a facing layer provided on the other surface of the assembly, the fabric layer and the facing layer being individually provided on the different surfaces of the assembly and being adhered by heating to the assembly with a hotmelt adhesive film having a plurality of slits therein.

2. A laminate structure of interior finishing material having suitable air permeability and sound absorbing properties, the laminate structure comprising a thermoplastic rigid polyurethane foam layer in the form of a platelike member, a reinforcing layer of glass paper provided on each surface of the foam layer and adhered thereto with a hotmelt adhesive film having a plurality of slits therein, and a facing layer provided on the reinforcing layer over one surface of the foam layer.

* * * * *